United States Patent
Liu et al.

(10) Patent No.: US 9,888,034 B2
(45) Date of Patent: Feb. 6, 2018

(54) PLUGGABLE API FIREWALL FILTER

(71) Applicant: Oracle International Corporation, Redwood Shores, CA (US)

(72) Inventors: Wen Feng Liu, Beijing (CN); Xiaohong Si, Beijing (CN); Min Feng Xu, Beijing (CN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 16 days.

(21) Appl. No.: 14/582,351

(22) Filed: Dec. 24, 2014

(65) Prior Publication Data

US 2016/0191564 A1 Jun. 30, 2016

(51) Int. Cl.
*G06F 9/00* (2006.01)
*H04L 29/06* (2006.01)

(52) U.S. Cl.
CPC ...... *H04L 63/1458* (2013.01); *H04L 63/0227* (2013.01); *H04L 63/0209* (2013.01)

(58) Field of Classification Search
CPC ............. H04L 63/1458; H04L 63/0227; H04L 63/0209
See application file for complete search history.

(56) References Cited

U.S. PATENT DOCUMENTS

| | | | |
|---|---|---|---|
| 6,701,438 B1* | 3/2004 | Prabandham | H04L 63/1425 707/999.01 |
| 7,392,255 B1* | 6/2008 | Sholtis | G06F 17/30566 |
| 7,865,931 B1* | 1/2011 | Stone | G06F 21/31 713/170 |
| 7,953,100 B2* | 5/2011 | Selitser | H04L 67/101 370/401 |
| 8,321,955 B2* | 11/2012 | Feng | G06F 21/554 380/1 |
| 8,572,710 B2 | 10/2013 | Narayanan et al. | |
| 8,856,869 B1* | 10/2014 | Brinskelle | H04L 63/08 726/12 |
| 2002/0157020 A1* | 10/2002 | Royer | H04L 63/0281 726/4 |
| 2006/0010195 A1* | 1/2006 | Mamou | G06Q 10/10 709/203 |
| 2006/0047755 A1* | 3/2006 | Jurova | H04L 67/02 709/206 |
| 2008/0209539 A1* | 8/2008 | Padmanabhuni | G06F 15/173 726/12 |
| 2010/0235632 A1* | 9/2010 | Iyengar | H04L 9/3213 713/166 |
| 2011/0231921 A1* | 9/2011 | Narayanan | G06F 21/335 726/9 |

(Continued)

OTHER PUBLICATIONS

Oracle Communications; "Making Money Through API Exposure Enabling New Business Models"; Oracle White Paper; Sep. 2014; pp. 15.

*Primary Examiner* — Khoi Le
(74) *Attorney, Agent, or Firm* — Miles & Stockbridge P.C.

(57) ABSTRACT

A web server includes a servlet and a pluggable API firewall filter coupled to the servlet. The pluggable filter protects the web server from content based attacks by rejecting messages received from a client device. The pluggable filter includes a .jar, and the .jar is placed into a class path of the web server or packaged into a target web application archive (WAR).

11 Claims, 6 Drawing Sheets

(56) References Cited

U.S. PATENT DOCUMENTS

| | | | |
|---|---|---|---|
| 2012/0155274 A1* | 6/2012 | Wang | H04W 12/12 370/236 |
| 2013/0254879 A1* | 9/2013 | Chesla | H04L 63/1458 726/22 |
| 2014/0033170 A1 | 1/2014 | Nimashakavi et al. | |
| 2014/0123278 A1 | 5/2014 | Thubert et al. | |

* cited by examiner

PLUGGABLE API FIREWALL FILTER

FIELD

One embodiment is directed generally to a computer system, and in particular to a computer system that includes a firewall.

BACKGROUND INFORMATION

In computing, a denial-of-service ("DoS") or distributed denial-of-service ("DDoS") attack is an attempt to make a machine or network resource unavailable to its intended users. Although the means to carry out, the motives for, and targets of a DoS attack vary, it generally consists of efforts to temporarily or indefinitely interrupt or suspend services of a host connected to the Internet.

Perpetrators of DoS attacks typically target sites or services hosted on high-profile web servers such as banks, credit card payment gateways, and even root nameservers. One common method of attack involves saturating the target machine with external communications requests, so much so that it cannot respond to legitimate traffic, or responds so slowly as to be rendered essentially unavailable. Such attacks usually lead to a server overload.

In general, DoS attacks are implemented by either forcing the targeted computer to reset, or consuming its resources so that it can no longer provide its intended service or obstructing the communication media between the intended users and the victim so that they can no longer communicate adequately.

SUMMARY

One embodiment is a web server that includes a servlet and a pluggable API firewall filter coupled to the servlet that protects the web server from content based attacks by rejecting messages received from a client device. The pluggable filter includes a .jar, and the .jar is placed into a class path of the web server or packaged into a target web application archive (WAR).

DETAILED DESCRIPTION

One embodiment is an application programming interface ("API") firewall filter that plugs into a servlet on a web server. The firewall filter functions as a Hypertext Transfer Protocol ("HTTP") filter to protect against denial-of-service ("DoS") attacks against the web server, including Extensible Markup Language ("XML") or JavaScript Object Notation ("JSON") based DoS attacks. Because embodiments are software based, they can be relatively easily (as compared to a hardware solution) placed within any existing servlet and provide the filtering functionality.

Figure 1:
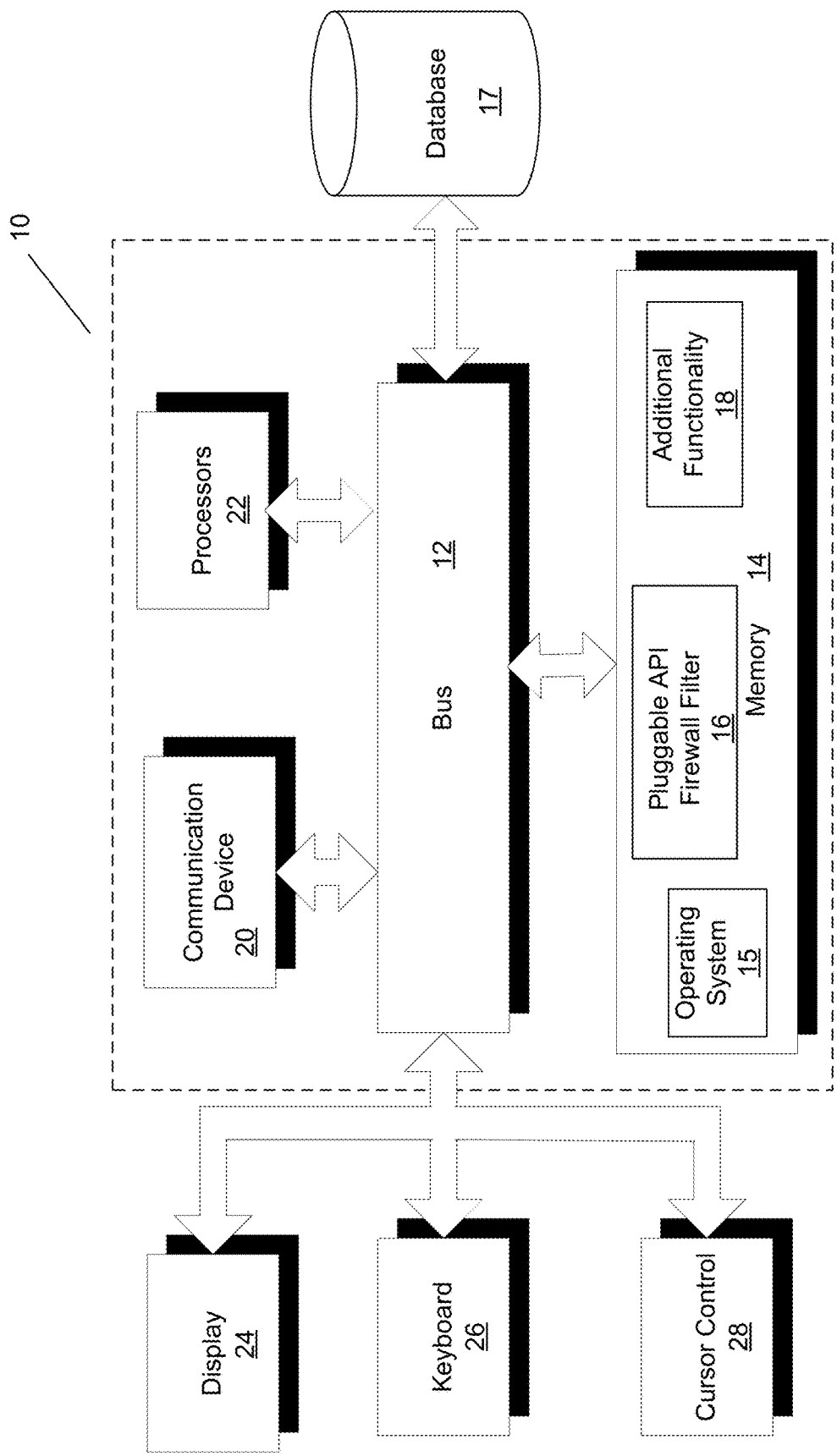
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a pluggable API firewall filter module 16 for providing firewall functionality to prevent DoS attacks, and all other functionality disclosed herein. System 10 can be part of a larger system, such as a web server and any other associated functionality. Therefore, system 10 can include one or more additional functional modules 18 to include the additional functionality. In one embodiment, the additional functionality is the "Oracle Communications Services Gatekeeper" ("OCSG") from Oracle Corp. A database 17 is coupled to bus 12 to provide centralized storage for modules 16 and 18 and store profiles, listings of attempted DoS attacks, etc.

Figure 2:
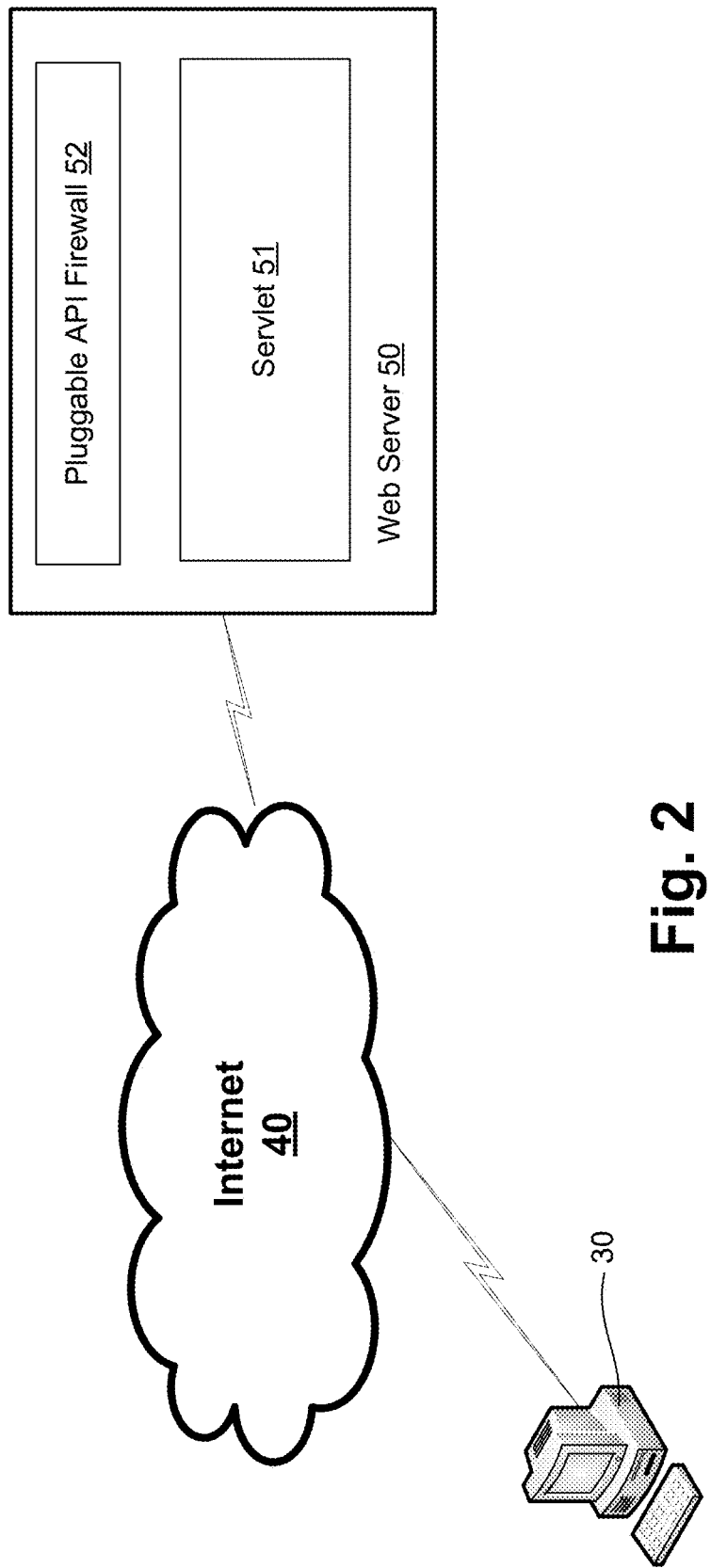
FIG. 2 is an overview block diagram of embodiments of the invention.

FIG. 2 is an overview block diagram of embodiments of the invention. FIG. 2 illustrates various network elements that implement or interact with embodiments of the invention. In other embodiments, additional network elements may be present.

An end user/client device 30 is in communication with a web server 50 via the Internet 40 or any other network. End user device 30 can be any type of device that includes a browser or other mechanism for communication with web server 50. For example, end user device 30 can be a desktop or laptop computer, a smartphone, etc. In the example of FIG. 2, end user device 30 is the source of a potential DoS attack on web server 50. However, the source of a DoS attack can be any device able to send a message or otherwise communicate with web server 50.

Web server 50 is a computer system that processes requests for web pages and other content. The communication between client 30 and server 50 takes place using HTTP. Web pages delivered to client 30 by server 50 are most frequently HyperText Markup Language ("HTML") documents, which may include images, style sheets and scripts in addition to text content. The most common use of web servers, such as web server 50, is to host websites, but there are other uses such as gaming, data storage, running enterprise applications, handling email, File Transfer Protocol ("FTP"), etc.

A user agent at client 30, commonly a web browser or web crawler, initiates communication by making a request for a specific resource using HTTP, and server 50 responds with the content of that resource or an error message if unable to do so. The resource is typically a file on the server's secondary storage, but this is not necessarily the case and depends on how the web server is implemented.

Web server 50 includes a servlet 51. A servlet is a Java programming language class used to extend the capabilities of a server. Although servlets can respond to any types of requests, they are commonly used to extend the applications hosted by web servers, so they can be considered analogous to Java applets that run on servers instead of in web browsers. Servlets are typically used to process or store data that was submitted from an HTML form, provide dynamic content such as the results of a database query, and manage state information that does not exist in the stateless HTTP protocol, such as filling the articles into the shopping cart of the appropriate customer.

Technically, a "servlet" is a Java class in Java EE that conforms to the Java Servlet API, a standard for implementing Java classes which respond to requests. Servlets can in general communicate over any client/server protocol, but they are most often used with the HTTP protocol.

A software developer may use a servlet to add dynamic content to a web server using the Java platform. The generated content is commonly HTML, but may be other data such as XML. Servlets can maintain state in session variables across many server transactions by using HTTP cookies, or uniform resource locator ("URL") rewriting.

To deploy and run a servlet, a web container is used. A web container (also referred to as a "servlet container") is essentially the component of a web server that interacts with the servlets. The web container is responsible for managing the lifecycle of servlets, mapping a URL to a particular servlet and ensuring that the URL requester has the correct access rights.

The servlet API, contained in the Java package "hierarchy javax.servlet," defines the expected interactions of the web container and a servlet. The basic servlet package defines Java objects to represent servlet requests and responses, as well as objects to reflect the servlet's configuration parameters and execution environment. The package "javax.servlet.http" defines HTTP-specific subclasses of the generic servlet elements, including session management objects that track multiple requests and responses between the web server and a client. Servlets may be packaged in a Web application Archive ("WAR") file as a web application.

Web server 50 includes a pluggable API firewall 52. A pluggable API in one embodiment is an all software API that can be easily, relative to a hardware installation, added to servlet 51 and provides functionality to web server 50. In one embodiment, web server 50 is implemented by system 10 of FIG. 1, and pluggable API firewall 52 is implemented by pluggable API firewall filter module 16 of FIG. 1.

In order to add pluggable API firewall 52 to servlet 51, in one embodiment a pluggable API firewall Java Archive ("JAR") file, or .jar, is placed into the class path of web server 50 or is packaged into the target WAR. The web.xml in the target WAR is then opened, and the following lines are added:

```
<filter>
  <filter-name>apiFirewallFilter</filter-name>
  <filter-class>oracle.ocsg.api_firewall.filter.GenericAPIFirewallFilter
  </filter-class>
</filter>
<filter-mapping>
  <filter-name>apiFirewallFilter</filter-name>
  <url-pattern>/*</url-pattern>
</filter-mapping>
```

The target WAR will then be redeployed, and pluggable API firewall 52 will be active to protect against content based attacks.

Figure 3:
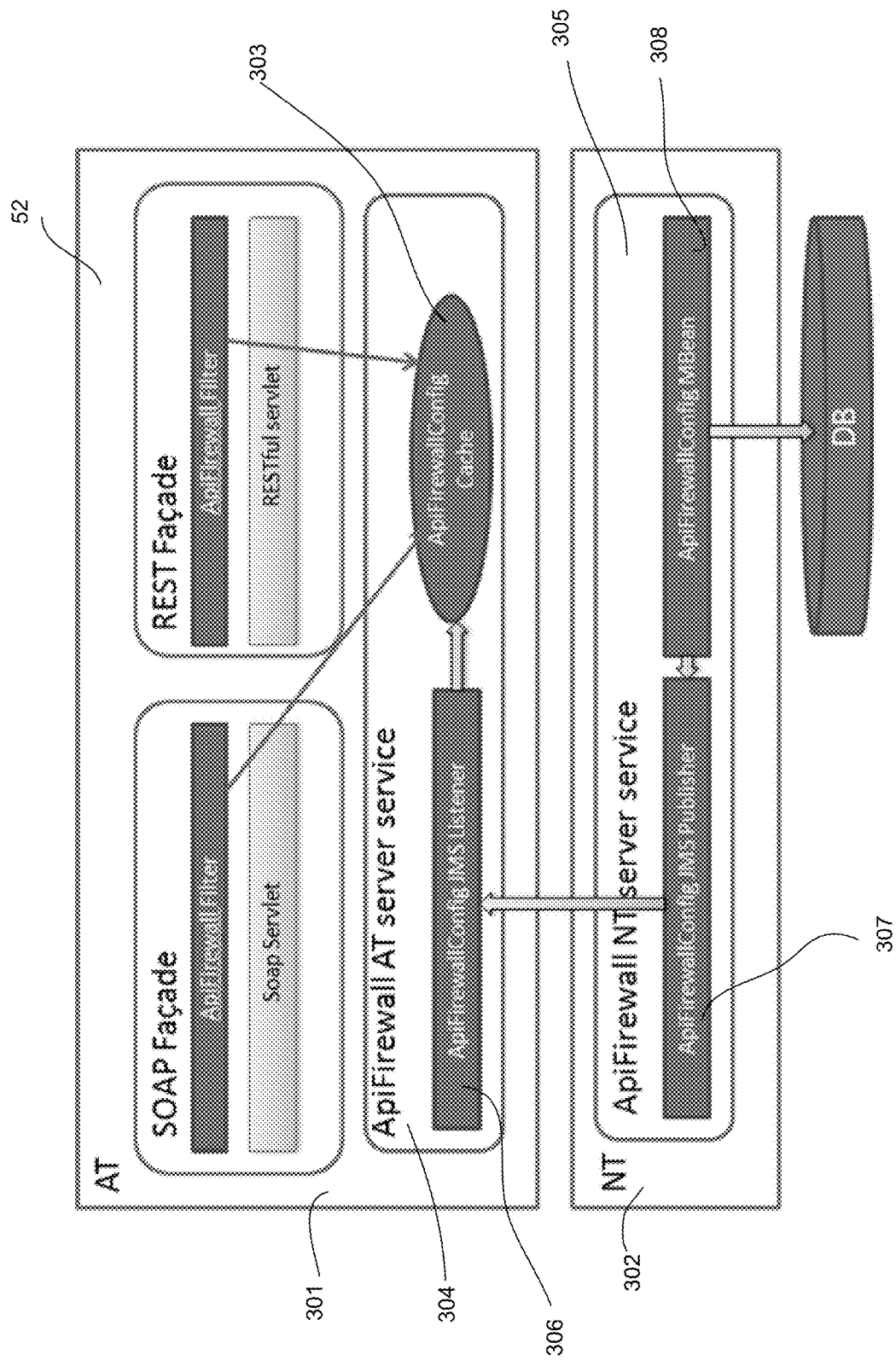
FIG. 3 is a block diagram overview of a pluggable API firewall of FIG. 2 in accordance with one embodiment.

FIG. 3 is a block diagram overview of pluggable API firewall 52 of FIG. 2 in accordance with one embodiment. Firewall 52 includes an Access Tier ("AT") 301, that is a top tier used to parse Simple Object Access protocol ("SOAP") messages and Representational state transfer ("REST") messages. Network Tier ("NT") 302 is a business tier that handles traffic sessions. In general, firewall 52 intercepts SOAP and REST messages and performs a verification to avoid all possible DoS content attacks.

Firewall 52 includes an APIFirewall Configuration Cache 303 which is a cache that stores the related configuration in memory to speed up the visit performance. It exposes get API to handlers and set APIs to a ApiFirewall Configuration JMS listener 306. APIFirewall AT server service 304 is a server service within AT layer 301 to register APIFirewall Configuration JMS listener 306.

APIFirewall NT server service 305 is a server service within NT layer 302 to register an APIFirewall Configuration MBean 308. APIFirewall Configuration JMS listener 306 is a Java Message Service ("JMS") listener that listens to the latest configuration update and refreshes cache 303.

APIFirewall Configuration JMS publisher 307 is a JMS publisher that publishes the configuration update event to a listener in response to updates to the configuration via Mbean 308.

APIFirewall Configuration MBean 308 is a managed bean ("MBean") that is exposed to admin to set/persist API firewall related configurations, such as max layout size, max child element depth, max item value size, API based enablers, etc.). An Mbean is an object that represents resources.

In one embodiment, to protect web server 50, and any other associated devices, from a DoS attack, pluggable API firewall 52 detects and rejects such attacks before real traffic is handled. In one embodiment, the following types of attacks are handled:

SOAP/REST validation, defense against XML poisoning;
JSON/XML content attack defense; and
Cryptography attack defense.

Figure 4:
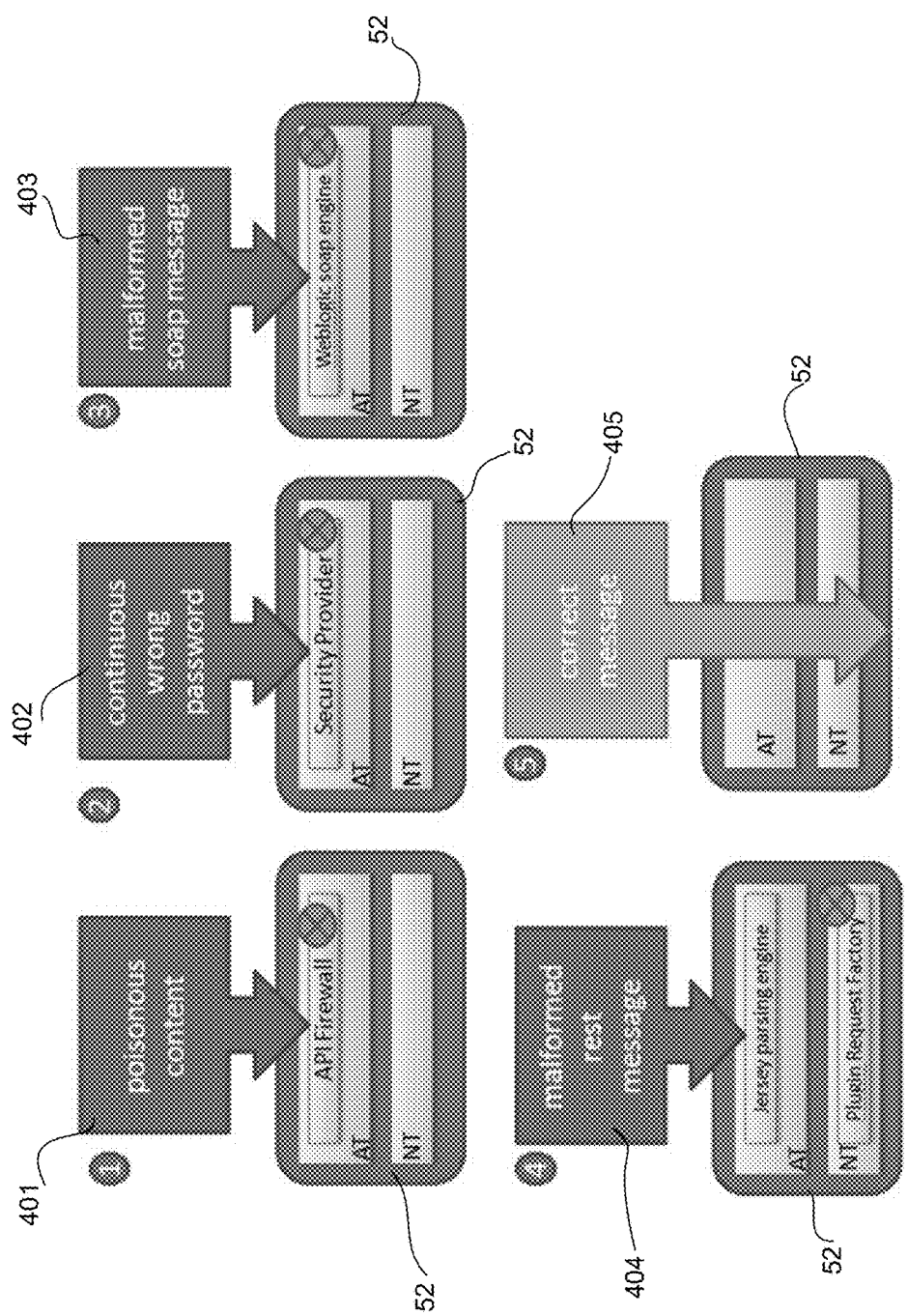
FIG. 4 illustrates some of the various types of attempted DoS attacks that are handled by the pluggable API firewall in accordance with embodiments of the present invention.

FIG. 4 illustrates some of the various types of attempted DoS attacks that are handled by pluggable API firewall 52 in accordance with embodiments of the present invention.

At 401, a "poisonous content attack" is a DoS attack that includes sending out messages which match the schema but with oversize elements to exhaust the resource. For SOAP messages, it includes:

Oversized payloads;
Oversized element names, attribute names, and processing instruction target names;
Oversized attributes array per element;
Elements which exceed the max nesting depth; or
Oversized processing instructions, comments, single CDATA items, and attribute values.

For Restful (JSON) messages, it includes:
Oversized message layout;
Oversized JSON element value;
Oversized JSON array elements; and
Oversized nesting element depth.

Pluggable API firewall 52 rejects these types of messages.

At 402, a "continuous wrong password attack" is a DoS attack that involves continuous attempts to access systems with wrong passwords. In one example embodiment, in combination with the default security provided from an Oracle WebLogic server, the users will be locked for 30 minutes in instances of 5 wrong passwords/PINs.

At 403, a "malformed SOAP message" is an invalid SOAP message layout which does not match the SOAP schema and is used by the attacker to waste the computer resources, or a custom entity expansion (e.g., an "XML bomb"), an external entity reference (e.g., system file accessing), or a recursive entity expansion.

At 404, for a "malformed REST message", a "Jersey" parsing engine will bypass the wrong element and pluggable API firewall 52 will reject it if a mandatory parameter is missing.

At 405, in the event of a correct message, pluggable API firewall 52 will pass the message through to servlet 51 and the rest of web server 50.

In general, embodiments focus on XML/JSON message-based denial-of-service attacks where message processing weaknesses are exploited in a manner that exhausts one or more system resources (e.g., CPU, memory, etc.). In one embodiment, pluggable API firewall 52 includes firewalls for SOAP and REST based messages.

API Firewall for SOAP

A SOAP message always is XML formatted, so pluggable API firewall 52 handles XML content attacks. To keep the scanning speed as fast as possible, in one embodiment a Streaming API for XML ("StAX") parser performs the content validation. In comparison to a Document Object Model ("DOM"), StAX is event driven and only chooses the interesting point to parse. In contrast, DOM parses all XML strings as a tree in memory, and will consequently exhaust the memory, especially when hackers attack systems using oversized messages. StAX is a "Pull" style to handle the event, and allows applications to move the StAX parser from item to item in the XML file. The parser is designed to be the lowest level and most efficient way to read XML data.

Limit Oversized Message Layout

The following is an example of a request and response by pluggable API firewall 52 where the allowed max length is 128:

```
Request:
    POST /parlayx21/sms/SendSms HTTP/1.1
    Content-type: text/xml;charset="utf-8"
    Soapaction: ""
    Accept: text/xml, multipart/related, text/html, image/gif, image/jpeg, *; q=.2, */*; q=.2
    User-Agent: JAX-WS RI 2.1.7-b01-
    Host: localhost:7999
    Connection: keep-alive
    Content-Length: 1244
    <?xml version='1.0' encoding='UTF-8'?><S:Envelope
    xmlns:S="http://schemas.xmlsoap.org/soap/envelope/"><S:Header><wsse:Security
    xmlns:wsse="http://docs.oasis-open.org/wss/2004/01/oasis-200401-wss-wssecurity-secext-
    1.0.xsd"><wsse:UsernameToken xmlns:wsu="http://docs.oasis-open.org/wss/2004/01/oasis-
    200401-wss-wssecurity-utility-1.0.xsd"
    wsu:Id="unt_IwwbZYL3QbjACud4"><wsse:Username>domain_user</wsse:Username><wsse:Password
    Type="http://docs.oasis-open.org/wss/2004/01/oasis-200401-wss-username-token-profile-
    1.0#PasswordText">domain_user</wsse:Password></wsse:UsernameToken></wsse:Security><Session
    xmlns="http://schemas.xmlsoap.org/soap/envelope/"><SOAP-ENV:SessionId xmlns:SOAP-
    ENV="http://schemas.xmlsoap.org/soap/envelope/">app:936563798938425972</SOAP-
    ENV:SessionId></Session></S:Header><S:Body><ns2:sendSms
    xmlns:ns2="http://www.csapi.org/schema/parlayx/sms/send/v2_2/local"
    xmlns:ns3="http://www.csapi.org/schema/parlayx/common/v2_1"><ns2:addresses>tel:1234</ns2:addresses
    ><ns2:message>Hello,
    world</ns2:message><ns2:receiptRequest><endpoint>http://10.182.105.52:13444/jaxws/SmsNotification
    </endpoint><interfaceName>interfaceName</interfaceName><correlator>987654321</correlator
    ></ns2:receiptRequest></ns2:sendSms></S:Body></S:Envelope>
Response:
    HTTP/1.1 400 Bad Request
    Date: Wed, 25 Sep 2013 09:30:38 GMT
    Transfer-Encoding: chunked
    Content-Type: text/xml; charset=utf-8
    X-Powered-By: Servlet/2.5 JSP/2.1
```

The input xml body exceeds the max message size!

Limit Oversized Items' (Element/Attribute/Comment/Namespace) Value Length

The following is an example of a request and response by pluggable API firewall 52 when the allowed max length is 50:

```
Request:(message = Hello, world! Hello, world! Hello, world! Hello, world! Hello, world!
Hello, world! Hello, world! Hello, world!):
    POST /parlayx21/sms/SendSms HTTP/1.1
    Content-type: text/xml;charset="utf-8"
    Soapaction: ""
    Accept: text/xml, multipart/related, text/html, image/gif, image/jpeg, *; q=.2, */*; q=.2
    User-Agent: JAX-WS RI 2.1.7-b01-
    Host: localhost:7999
    Connection: keep-alive
    Content-Length: 1244
    <?xml version='1.0' encoding='UTF-8'?><S:Envelope
    xmlns:S="http://schemas.xmlsoap.org/soap/envelope/"><S:Header><wsse:Security
    xmlns:wsse="http://docs.oasis-open.org/wss/2004/01/oasis-200401-wss-wssecurity-secext-
    1.0.xsd"><wsse:UsernameToken xmlns:wsu="http://docs.oasis-open.org/wss/2004/01/oasis-
    200401-wss-wssecurity-utility-1.0.xsd"
    wsu:Id="unt_IwwbZYL3QbjACud4"><wsse:Username>domain_user</wsse:Username><wsse:Password
    Type="http://docs.oasis-open.org/wss/2004/01/oasis-200401-wss-username-token-profile-
    1.0#PasswordText">domain_user</wsse:Password></wsse:UsernameToken></wsse:Security><Session
    xmlns="http://schemas.xmlsoap.org/soap/envelope/"><SOAP-ENV:SessionId xmlns:SOAP-
    ENV="http://schemas.xmlsoap.org/soap/envelope/">app:936563798938425972</SOAP-
    ENV:SessionId></Session></S:Header><S:Body><ns2:sendSms
    xmlns:ns2="http://www.csapi.org/schema/parlayx/sms/send/v2_2/local"
    xmlns:ns3="http://www.csapi.org/schema/parlayx/common/v2_1"><ns2:addresses>tel:1234</ns2:addresses>
    <ns2:message>Hello, world! Hello, world! Hello, world! Hello, world! Hello, world! Hello, world!
    Hello, world! Hello, world!</ns2:message><ns2:receiptRequest>
    <endpoint>http://10.182.105.52:13444/jaxws/SmsNotification</endpoint>
    <interfaceName>interfaceName</interfaceName><correlator>987654321</correlator>
    </ns2:receiptRequest></ns2:sendSms></S:Body></S:Envelope>
Response:
    HTTP/1.1 400 Bad Request
    Date: Wed, 25 Sep 2013 09:30:38 GMT
    Transfer-Encoding: chunked
    Content-Type: plain/test; charset=utf-8
    X-Powered-By: Servlet/2.5 JSP/2.1
```

The element value length exceeds the max size!

Limit the Max Depth of Nesting Elements

Hackers will sometimes append too many nesting elements to exhaust CPU or memory resources. Pluggable API firewall 52 in one embodiment will limit the maximum depth of the nesting elements and reject it as 400 (i.e., bad request). The following is an example of a request and response by pluggable API firewall 52 in which the max allowed nesting elements depth is 5, so that the below request will be rejected with error code 400:

```
Request:
    <root>
        <obj>
            <name>name</name>
            <value>
                <obj>
                    <name>name2</name>
                    <value>
                        <obj>
```

```
                            <name>name3</name>
                            <value>
                                ... ...
                        </obj>
                </obj>
            </root>
Response:
    HTTP/1.1 400 Bad Request
    Date: Wed, 25 Sep 2013 09:30:38 GMT
    Transfer-Encoding: chunked
    Content-Type: plain/test; charset=utf-8
    X-Powered-By: Servlet/2.5 JSP/2.1
```

The nesting depth exceeds the max limit!

Limit the Max Number of Items (Announced as Unbounded)

Some Document Type Definition ("DTD") will announce attribute or elements as an array with "0 . . . unbounded". If a hacker utilizes it to generate an extremely large array, the CPU/memory will be exhausted. API Firewall 52 will limit the max number of such an array. The following is an example of a request and response by pluggable API firewall 52 if the max allowed max size of array is 5, resulting in the request rejected with error code 500:

Request:
```
POST /parlayx21/sms/SendSms HTTP/1.1
Content-type: text/xml;charset="utf-8"
Soapaction: ""
Accept: text/xml, multipart/related, text/html, image/gif, image/jpeg, *; q=.2, */*; q=.2
User-Agent: JAX-WS RI 2.1.7-b01-
Host: localhost:7999
Connection: keep-alive
Content-Length: 1244
<?xml version='1.0' encoding='UTF-8'?><S:Envelope
xmlns:S="http://schemas.xmlsoap.org/soap/envelope/"><S:Header><wsse:Security
xmlns:wsse="http://docs.oasis-open.org/wss/2004/01/oasis-200401-wss-wssecurity-secext-
1.0.xsd"><wsse:UsernameToken xmlns:wsu="http://docs.oasis-open.org/wss/2004/01/oasis-
200401-wss-wssecurity-utility-1.0.xsd"
wsu:Id="unt_IwwbZYL3QbjACud4"><wsse:Username>domain_user</wsse:Username><wsse:Password
Type="http://docs.oasis-open.org/wss/2004/01/oasis-200401-wss-username-token-profile-
1.0#PasswordText">domain_user</wsse:Password></wsse:UsernameToken></wsse:Security><Session
xmlns="http://schemas.xmlsoap.org/soap/envelope/"><SOAP-ENV:SessionId xmlns:SOAP-
ENV="http://schemas.xmlsoap.org/soap/envelope/">app:936563798938425972</SOAP-
ENV:SessionId></Session></S:Header><S:Body><ns2:sendSms
xmlns:ns2="http://www.csapi.org/schema/parlayx/sms/send/v2_2/local"
xmlns:ns3="http://www.csapi.org/schema/parlayx/common/v2_1"><ns2:addresses>tel:1234</ns2:addresses>
<ns2:addresses>tel:1235</ns2:addresses><ns2:addresses>tel:1236</ns2:addresses>
<ns2:addresses>tel:1237</ns2:addresses><ns2:addresses>tel:1238</ns2:addresses><ns2:message>Hello,
world</ns2:message><ns2:receiptRequest><endpoint>http://10.182.105.52:13444/jaxws/SmsNotification
</endpoint><interfaceName>interfaceName</interfaceName><correlator>987654321</correlator>
</ns2:receiptRequest></ns2:sendSms></S:Body></S:Envelope>
```
Response:
```
HTTP/1.1 400 Bad Request
Date: Wed, 25 Sep 2013 09:30:38 GMT
Transfer-Encoding: chunked
Content-Type: plain/test; charset=utf-8
X-Powered-By: Servlet/2.5 JSP/2.1
```

The array size exceeds the max size!

Custom/External/Recursive Entity Expansion

One embodiment includes a Weblogic SOAP engine that by default ignores all DTD entity definition in a SOAP message, so the below example attacks will be rejected by pluggable API firewall 52. The following is an example of a request and response by pluggable API firewall 52 if they include any reference towards the entity DTD definition.

An "XML bomb" is a message composed and sent with the intent of overloading an XML parser (typically an HTTP server). XML bombs exploit the fact that XML allows defining of entities. For example, let "entityOne" be defined as of 20 "entityTwo's", which themselves are defined as 20 "entityThree's." If the same pattern is continued until entityEight, the XML parser will unfold a single occurrence of entityOne to 1,280,000,000 entityEight's, taking up 5 GBs of memory. The ultimate goal of the attack is to deny service to a web application.

For example:

```
<?xml version="1.0" encoding="utf-8"?>
<!DOCTYPE something [
<!ENTITY x0 "Developers!">
<!ENTITY x1 "&x0;&x0;">
<!ENTITY x2 "&x1;&x1;">
<!ENTITY x3 "&x2;&x2;">
<!ENTITY x4 "&x3;&x3;">
...
<!ENTITY x100 "&x99;&x99;">
]>
<something>&x100;</something>
```

If the Xml parser tries to expand it, the final value of &x100 would be an oversized string. Weblogic will detect such "bomb" and reject as a server error (500).

Recursive Entity Reference Loop

A Recursive Entity reference in XML would cause problems. For example:

```
<!ELEMENT to (#PCDATA)>
<!ELEMENT from (#PCDATA)>
<!ENTITY % xx '%zz;'>
<!ENTITY % zz '%xx;'>
%xx;
```

With the above XML, a recursive entity reference "% xx" will be generated. (Reference path: % xx->% zz->% xx-> . . . ).

External Entity Reference

An external entity can access local or remote content via a declared system identifier. The system identifier is assumed to be a uniform resource identifier ("URI") that can be referenced (accessed) by the XML processor when processing the entity. A hacker can inject the custom entity to access an unavailable resource, or get access to the sensitive system profile such as a password. For example:

Accessing a remote resource that may not return:

```
<?xml version="1.0" encoding="ISO-8859-1"?>
<!DOCTYPE foo [
<!ELEMENT foo ANY >
<!ENTITY xxe SYSTEM "http://11.11.11.1:5001/
unavailable" >]><foo>&xxe;</foo>
```

Disclosing a password or other targeted files:

```
<?xml version="1.0" encoding="ISO-8859-1"?>
<!DOCTYPE foo [
  <!ELEMENT foo ANY >
  <!ENTITY xxe SYSTEM "file:///etc/passwd" >]><foo>&xxe;</foo>
<?xml version="1.0" encoding="ISO-8859-1"?>
<!DOCTYPE foo [
  <!ELEMENT foo ANY >
  <!ENTITY xxe SYSTEM "file:///etc/shadow" >]><foo>&xxe;</foo>
<?xml version="1.0" encoding="ISO-8859-1"?>
<!DOCTYPE foo [
  <!ELEMENT foo ANY >
  <!ENTITY xxe SYSTEM "file:///c:/boot.ini" >]><foo>&xxe;</foo>
<?xml version="1.0" encoding="ISO-8859-1"?>
<!DOCTYPE foo [
  <!ELEMENT foo ANY >
  <!ENTITY xxe SYSTEM "http://www.attacker.com/text.txt">]>
  <foo>&xxe;</foo>
```

To avoid such security holes, pluggable API firewall 52 will forbid all external entity usage. After detecting such a reference, Weblogic Soap engine will return back a server error (500).

RESTful API Firewall

Restful API content protection in one embodiment focuses on JSON and XML formatted messages JSON—Limit the Size of Message In case the allowed max length is 128, if the request body is beyond it, pluggable API firewall 52 will reject it, as shown in the following example request and response:

```
Request (content length is 323):
    POST /oneapi/1/smsmessaging/outbound/tel%3A1234/requests
    HTTP/1.1
    Content-Type: application/json
    Accept: application/json
    X-Session-ID: app:936563798938425972
    Authorization: Basic ZG9tYWluX3VzZXl6ZG9tYWluX3VzZXl=
    User-Agent: Java/1.7.0_17
    Host: localhost:7999
    Connection: keep-alive
    Content-Length: 323
    {"outboundSMSMessageRequest":{"address":"tel:7878",
    "senderAddress":"tel:1234","senderName":"Sender",
    "receiptRequest":{"notifyURL":"http://10.182.105.52:13444/
    jaxrs/outbound/notifications/notifyOutboundSmsDeliveryStatus",
    "callbackData":""},"outboundSMSTextMessage":{"message":
    "Hello, world"},"clientCorrelator":"987654321"}}
Response:
    HTTP/1.1 400 Internal Server Error
    Date: Wed, 25 Sep 2013 09:30:38 GMT
    Transfer-Encoding: chunked
    Content-Type: plain/text; charset=utf-8
    X-Powered-By: Servlet/2.5 JSP/2.1
```

The input body exceeds the max message size!

Limit the Size of Each JSON Element

In case the allowed max length of element value is 10, if the request body is beyond it, pluggable API firewall 52 will reject it as shown in the following example request and response:

```
Request(value of notifyURL is 40):
    POST /oneapi/1/smsmessaging/outbound/tel%3A1234/requests
    HTTP/1.1
    Content-Type: application/json
    Accept: application/json
    X-Session-ID: app:936563798938425972
    Authorization: Basic ZG9tYWluX3VzZXl6ZG9tYWluX3VzZXl=
    User-Agent: Java/1.7.0_17
    Host: localhost:7999
    Connection: keep-alive
    Content-Length: 323
    {"outboundSMSMessageRequest":{"address":"tel:7878",
    "senderAddress":"tel:1234","senderName":"Sender",
    "receiptRequest":{"notifyURL":"http://10.182.105.52:13444/
    jaxrs/outbound/notifications/notifyOutboundSmsDeliveryStatus",
    "callbackData":""},"outboundSMSTextMessage":{"message":
    "Hello, world"},"clientCorrelator":"987654321"}}
Response:
    HTTP/1.1 400 Bad Request
    Date: Wed, 25 Sep 2013 09:30:38 GMT
    Transfer-Encoding: chunked
    Content-Type: text/xml; charset=utf-8
    X-Powered-By: Servlet/2.5 JSP/2.1
```

The element length is oversized!

Limit the Total Number of JSON Elements

In the case where the allowed total number of JSON elements is 5, if the request body is beyond it, pluggable API firewall 52 will reject it, as shown in the following example request and response:

```
Request("address" array size is 6):
    POST /oneapi/1/smsmessaging/outbound/tel%3A1234/requests
    HTTP/1.1
    Content-Type: application/json
    Accept: application/json
    X-Session-ID: app:936563798938425972
    Authorization: Basic ZG9tYWluX3VzZXl6ZG9tYWluX3VzZXl=
    User-Agent: Java/1.7.0_17
    Host: localhost:7999
    Connection: keep-alive
    Content-Length: 348
    {"outboundSMSMessageRequest":{"address":["tel:1111",
    "tel:2222","tel:3333","tel:4444","tel:5555","tel:6666"],
    "senderAddress":"tel:1234","senderName":"Sender",
    "receiptRequest":{"notifyURL":"http://10.182.105.52:13444/jaxrs/
    outbound/notifications/notifyOutboundSmsDeliveryStatus",
    "callbackData":""},"outboundSMSTextMessage":{"message":
    "Hello, world"},"clientCorrelator":"987654321"}}
Response:
    HTTP/1.1 400 Bad Request
    Date: Wed, 25 Sep 2013 09:30:38 GMT
    Transfer-Encoding: chunked
    Content-Type: text/xml; charset=utf-8
    X-Powered-By: Servlet/2.5 JSP/2.1
```

The array sized exceeds the limit!

XML

In one embodiment, the RESTful pluggable API firewall 52 handles RESTful XML messages as disclosed above for the SOAP API firewall feature.

Configuration

In one embodiment, the MBean information is as follows:

Deployment Name:wlng

Instance Name:ApiFirewall

MBean Type:oracle.ocsg.api_firewall.nt.management.ApiFirewallMBean

Figure 5:
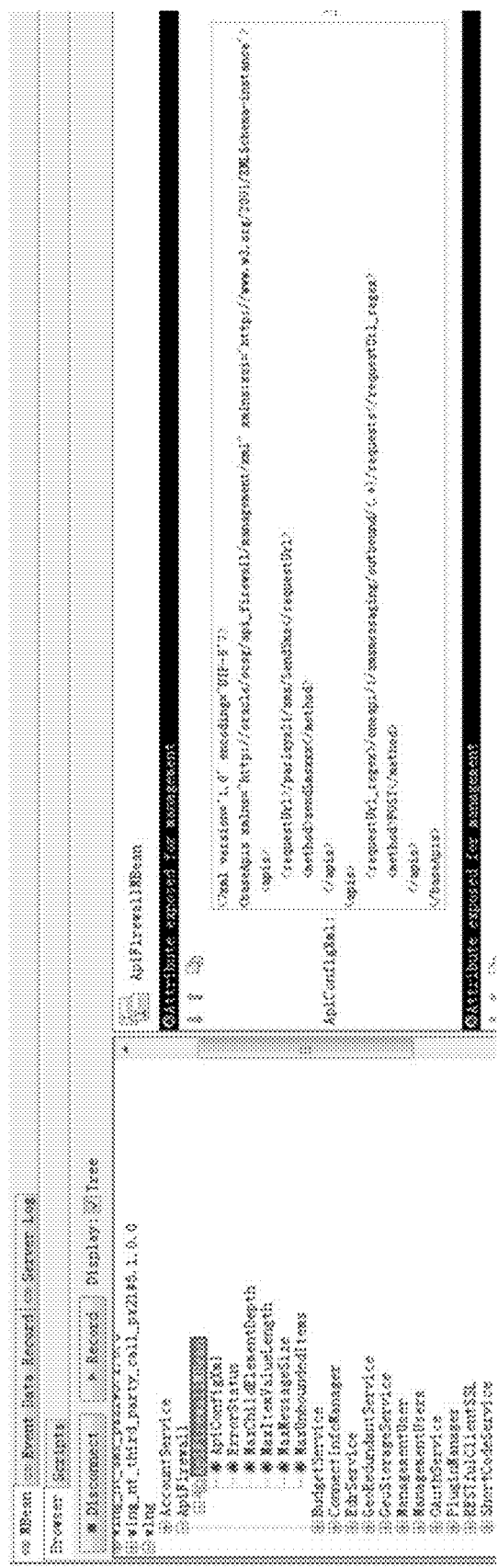
FIG. 5 is a screenshot illustrating details of the Mbean configuration in accordance with one embodiment.

FIG. 5 is a screenshot illustrating details of the Mbean configuration in accordance with one embodiment. The following attributes are used in one embodiment:

| name | type | description | default |
|---|---|---|---|
| maxMessageSize | int | the system allowed max layout size of the received request(attachment size is not calculated). If requests exceed the limit, 500 will be thrown | 1024 |
| maxChildElementDepth | int | the system allowed max nesting element depth in the received message. If requests exceed the limit, 500 will be thrown | 10 |
| MaxUnboundedItems | int | the system allowed max items(element/attribute/..) number which is announced as unbounded in schema. If requests exceed the limit, 500 will be thrown | 256 |
| MaxItemValueLength | int | the system allowed max value length of element/attribute/comment/namespace.. If requests exceed the limit, 500 will be thrown | 512 |
| ApiConfigXml | String | White list of protected APIs. If the API exists in the xml, API Firewall won't take effect to defend against attack for the API. | Empty |
| ErrorStatus | int | error status when API Firewall rejects the request. | 400 |

In one embodiment, the following API configuration schema is used:

```xml
<?xml version="1.0" encoding="UTF-8"?>
<schema xmlns="http://www.w3.org/2001/XMLSchema"
 targetNamespace="http://oracle/ocsg/api_firewall/management/xml"
 xmlns:tns="http://oracle/ocsg/api_firewall/management/xml"
 elementFormDefault="qualified">
    <element name="baseApis">
        <complexType>
            <complexContent>
                <extension base="tns:Apis">
                </extension>
            </complexContent>
        </complexType>
    </element>
    <complexType name="Apis">
        <sequence>
            <element name="apis" type="tns:Api" minOccurs="0"
maxOccurs="unbounded"></element>
        </sequence>
    </complexType>
    <complexType name="Api">
        <sequence>
            <choice>
                <element name="requestUrl" type="string"></element>
                <element name="requestUrl_regex"
                    type="string"></element>
            </choice>
            <element name="method" type="string" minOccurs="0"
maxOccurs="unbounded"></element>
        </sequence>
    </complexType>
</schema>
```

EXAMPLE

```xml
<?xml version="1.0" encoding="UTF-8"?>
<baseApis xmlns="http://oracle/ocsg/api_firewall/management/xml"
xmlns:xsi="http://www.w3.org/2001/XMLSchema-instance">
    <apis>
        <requestUrl>/parlayx21/sms/SendSms</requestUrl>
        <method>sendSmsLogo</method>
    </apis>
    <apis>
        <requestUrl_regex>/oneapi/1/smsmessaging/outbound/(.*)/requests</requestUrl_regex>
        <method>POST</method>
    </apis>
</baseApis>
```

Figure 6:
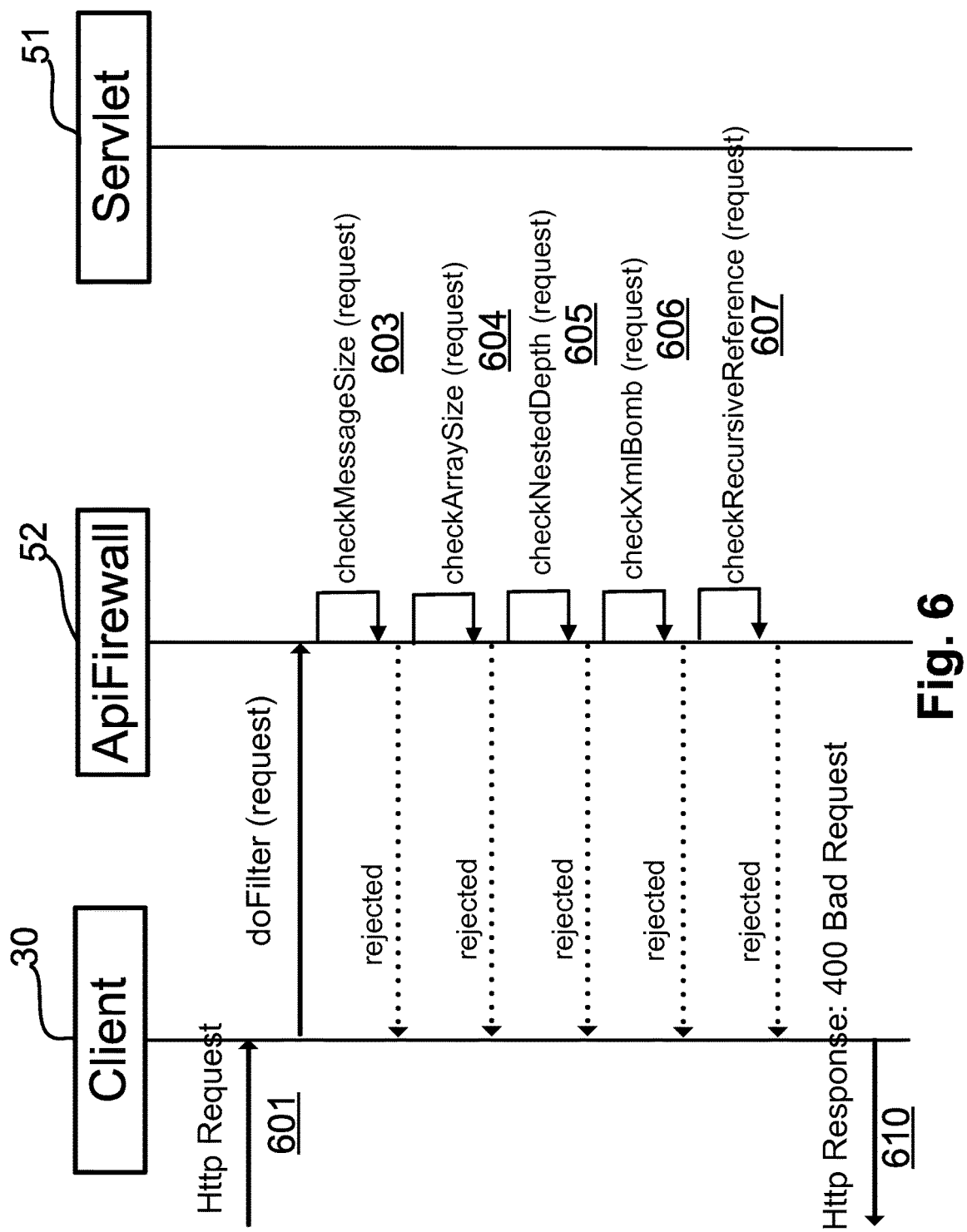
FIG. 6 is a call flow of the network elements of FIG. 2 in accordance with embodiments of the present invention.

FIG. 6 is a call flow of the network elements of FIG. 2 in accordance with embodiments of the present invention. The network elements of FIG. 6, also shown in FIG. 2, include client 30, pluggable API firewall 52 and servlet 51.

At 601, client 30 initiates an HTTP request directed to web server 50 (not shown in FIG. 6) that includes pluggable API firewall 52 and servlet 51. The request can be any type of HTTP request, and may be a legitimate request or part of a DoS request.

At 602, the request is converted into a doFilter(request) when received by pluggable API firewall 52. A doFilter (HttpRequest request) is a standard method of javax.servlet. Filter.

At 603, the message is checked for a maximum size message, as described above. If the maximum is exceeded, the message is rejected and fails to reach servlet 51. At 610, a HTTP response is generated indicating a bad request.

At 604, the message is checked for a maximum size array, as described above. If the maximum is exceeded, the message is rejected and fails to reach servlet 51. At 610, a HTTP response is generated indicating a bad request.

At 605, the message is checked for a maximum depth of nesting elements, as described above. If the maximum depth is exceeded, the message is rejected and fails to reach servlet 51. At 610, a HTTP response is generated indicating a bad request.

At 606, the message is checked for an XML bomb, as described above. If the message includes an XML bomb, the message is rejected and fails to reach servlet 51. At 610, a HTTP response is generated indicating a bad request.

At 607, the message is checked for a recursive reference, as described above. If the message includes a recursive reference, the message is rejected and fails to reach servlet 51. At 610, a HTTP response is generated indicating a bad request.

Although not shown in FIG. 6, if the message is not rejected, it is passed onto servlet 51 for processing.

As disclosed, embodiments provides servlet based systems with a method to protect from DoS content attacks without the need for additional hardware. Embodiments provide an API firewall that can plug into any web server.

Embodiments can reduce the deployment cost and improve network latency compared with adding additional API firewall hardware servers.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A web server comprising:
   a processor;
   a storage device coupled to the processor that stores instructions;
   a Java servlet;
   wherein, when the instructions are executed by the processor, the processor performs filtering comprising:
   generating a pluggable application programming interface (API) firewall filter by forming a Java Archive (JAR) file;
   placing the JAR file into a class path of the web server or packaging the JAR file into a target web application archive (WAR) to couple the pluggable API firewall filter to a Java servlet, wherein the servlet comprises a web.xml file, and the pluggable API firewall filter is configured in the web.xml file;
   adding the pluggable API firewall filter to the Java servlet for protecting the web server from content based attacks by rejecting messages received from a client device;
   receiving an incoming message comprising a Hypertext Transfer Protocol (HTTP) request from the client device;
   rejecting the incoming message from reaching the Java servlet in response to a determination that the incoming message is permanently rejected; and
   generating an HTTP response indicating that the incoming message was rejected, wherein the incoming message is rejected if it exceeds at least one of a maximum length, a maximum number of nesting elements or a maximum number of arrays.

2. The web server of claim 1, wherein the pluggable filter rejects Simple Object Access protocol (SOAP) messages.

3. The web server of claim 1, wherein the pluggable filter rejects Representational state transfer (REST) messages.

4. The web server of claim 1, wherein the incoming message is rejected if it includes a recursive reference.

5. A non-transitory computer-readable medium having instructions stored thereon that, when executed by a processor, cause the processor to perform filtering comprising:
   generating a pluggable application programming interface (API) firewall filter by forming a Java Archive (JAR) file;
   placing the JAR file into a class path of the web server or packaging the JAR file into a target web application archive (WAR) to couple the pluggable API firewall filter to a Java servlet, wherein the servlet comprises a web.xml file, and the pluggable API firewall filter is configured in the web.xml file;
   adding the pluggable API firewall filter to the Java servlet for protecting the web server from content based attacks by rejecting messages received from a client device;
   receiving an incoming message comprising a Hypertext Transfer Protocol (HTTP) request from the client device;
   rejecting the incoming message from reaching the Java servlet in response to a determination that the incoming message is permanently rejected; and
   generating an HTTP response indicating that the incoming message was rejected, wherein the incoming message is rejected if it exceeds at least one of a maximum length, a maximum number of nesting elements or a maximum number of arrays.

6. The computer-readable medium of claim 5, wherein the pluggable filter rejects Simple Object Access protocol (SOAP) messages.

7. The computer-readable medium of claim 5, wherein the pluggable filter rejects Representational state transfer (REST) messages.

8. A method of preventing denial of service attacks on a web server, the method comprising:
   generating a pluggable application programming interface (API) firewall filter by forming a Java Archive (JAR) file;
   placing the JAR file into a class path of the web server or packaging the JAR file into a target web application archive (WAR) to couple the pluggable API firewall filter to a Java servlet, wherein the servlet comprises a web.xml file, and the pluggable API firewall filter is configured in the web.xml file;
   adding the pluggable API firewall filter to the Java servlet for protecting the web server from content based attacks by rejecting messages received from a client device;
   receiving an incoming message comprising a Hypertext Transfer Protocol (HTTP) request from the client device;
   rejecting the incoming message from reaching the Java servlet in response to a determination that the incoming message is permanently rejected; and
   generating an HTTP response indicating that the incoming message was rejected, wherein the incoming message is rejected if it exceeds at least one of a
   maximum length, a maximum number of nesting elements or a maximum number of arrays.

9. The method of claim 8, wherein the pluggable filter rejects Simple Object Access protocol (SOAP) messages.

10. The method of claim 8, wherein the pluggable filter rejects Representational state transfer (REST) messages.

11. The method of claim 8, wherein the incoming message is rejected if it includes a recursive reference.

* * * * *